(12) United States Patent
Pawar et al.

(10) Patent No.: US 10,440,716 B1
(45) Date of Patent: Oct. 8, 2019

(54) DYNAMIC INCREASE OF CONTROL CHANNEL MODULATION ORDER CONDITIONAL ON BEAMFORMING TO A POOR-RF UE

(71) Applicant: Sprint Spectrum L.P., Overland Park, KS (US)

(72) Inventors: Hemanth B. Pawar, Brambleton, VA (US); Krishna Sitaram, Chantilly, VA (US); Chunmei Liu, Great Falls, VA (US); Pratik Kothari, Pune (IN)

(73) Assignee: Sprint Spectrum L.P., Overland Park, KS (US)

( * ) Notice: Subject to any disclaimer, the term of this patent is extended or adjusted under 35 U.S.C. 154(b) by 44 days.

(21) Appl. No.: 15/400,480

(22) Filed: Jan. 6, 2017

(51) Int. Cl.
| | | |
|---|---|---|
| *H04W 72/04* | (2009.01) | |
| *H04W 72/08* | (2009.01) | |
| *H04L 27/20* | (2006.01) | |
| *H04L 12/24* | (2006.01) | |
| *H04L 5/00* | (2006.01) | |
| *H04W 16/28* | (2009.01) | |
| *H04B 7/06* | (2006.01) | |
| *H04W 88/02* | (2009.01) | |
| *H04W 88/08* | (2009.01) | |

(52) U.S. Cl.
CPC ........ *H04W 72/046* (2013.01); *H04B 7/0617* (2013.01); *H04L 5/0007* (2013.01); *H04L 5/0057* (2013.01); *H04L 27/20* (2013.01); *H04L 41/0816* (2013.01); *H04W 16/28* (2013.01); *H04W 72/042* (2013.01); *H04W 72/085* (2013.01); *H04W 88/02* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 9,191,875 B1 * | 11/2015 | Kazeminejad | H04B 7/0617 |
| 2008/0002733 A1 * | 1/2008 | Sutskover | H04L 5/0023 |
| | | | 370/436 |
| 2010/0061345 A1 | 3/2010 | Wengerter et al. | |
| 2010/0238845 A1 * | 9/2010 | Love | H04B 7/15528 |
| | | | 370/280 |
| 2011/0070845 A1 * | 3/2011 | Chen | H04L 5/001 |
| | | | 455/91 |
| 2012/0302223 A1 * | 11/2012 | Austin | H04W 8/18 |
| | | | 455/418 |

(Continued)

*Primary Examiner* — Alpus Hsu
*Assistant Examiner* — Camquyen Thai

(57) ABSTRACT

A method and system for controlling wireless communication over an air interface between a base station and a user equipment device (UE) served by the base station. In examples, the base station is configured to use a particular modulation and coding scheme (MCS) to transmit downlink control signals over the air interface to the UE without the base station beamforming the downlink control signals to the UE. Responsive to the base station determining that the UE is experiencing threshold poor RF conditions on the air interface, the base station reconfigures itself to beamform downlink control signals to the UE. And, given that the base station is reconfigured to beamform downlink control signals to the UE, the base station further reconfigures itself to use a higher-order MCS to transmit downlink control signals to the UE.

20 Claims, 4 Drawing Sheets

(56) References Cited

U.S. PATENT DOCUMENTS

| | | |
|---|---|---|
| 2013/0029669 A1 | 1/2013 | Boudreau et al. |
| 2015/0119046 A1* | 4/2015 | Radulescu .............. H04L 43/10 |
| | | 455/438 |
| 2015/0230157 A1* | 8/2015 | Rattner ................. H04W 48/14 |
| | | 455/434 |
| 2016/0277087 A1* | 9/2016 | Jo ........................ H04B 7/0617 |
| 2017/0099673 A1* | 4/2017 | Byun .................... H04W 16/32 |
| 2017/0134207 A1* | 5/2017 | Liu ....................... H04L 1/0026 |

\* cited by examiner

DYNAMIC INCREASE OF CONTROL CHANNEL MODULATION ORDER CONDITIONAL ON BEAMFORMING TO A POOR-RF UE

BACKGROUND

In a wireless communication system, a base station could provide one or more coverage areas, such as cells or sectors, in which the base station could serve user equipment devices (UEs), such as cell phones, wirelessly-equipped personal computers or tablets, tracking devices, embedded wireless communication modules, or other devices equipped with wireless communication functionality (whether or not operated by a human user). In general, each coverage area could operate on one or more carriers each defining a respective bandwidth of coverage, and each coverage area could define an air interface providing a downlink for carrying communications from the base station to UEs and an uplink for carrying communications from UEs to the base station. The downlink and uplink could operate on separate carriers or could be time division multiplexed over the same carrier(s). Further, the air interface could define various channels for carrying communications between the base station and UEs. For instance, the air interface could define one or more downlink traffic channels and downlink control channels, and one or more uplink traffic channels and uplink control channels.

In accordance with the Long Term Evolution (LTE) standard of the Universal Mobile Telecommunications System (UMTS), for instance, each coverage area of a base station could operate on one or more carriers spanning 1.4 MHz, 3 MHz, 5 MHz, 10 MHz, 15 MHz, or 20 MHz. Each of these carriers is subdivided in both time and frequency to define an array of resource elements for carrying communications between the base station and UEs, with each resource element occupying a 15-kHz-wide subcarrier and 66.7 microseconds (µS). In particular, each carrier is divided in the frequency domain into groups of twelve 15-kHz wide subcarriers. And in the time domain, each 15-kHz-wide subcarrier is divided into a continuum of 10-millisecond (ms) frames, with each frame being further divided into ten 1-ms subframes that are in turn each divided into two 0.5-ms slots. Slots are each further sub-divided into a number (typically seven) of symbol times, with a single resource element corresponding to a symbol time of a particular subcarrier. In such an arrangement, each 1-ms subframe of a particular subcarrier includes fourteen 66.7-µs long resource elements plus a 4.69-µs guard band (cyclic prefix) per resource element to help avoid interference between resource elements.

Within a subframe, different resource elements can serve different functions. For instance, on the downlink, certain resource elements across the bandwidth of a carrier can be reserved for control signaling. In practice, resource elements of the first one, two, or three symbol times of a subframe are reserved to define various control channels, such as a Physical Downlink Control Channel (PDCCH) for carrying control signals such as page messages and resource allocations from a base station to UEs, a Physical Hybrid Automatic Repeat Request Indicator Channel (PHICH) for carrying messages indicating whether the base station received uplink transmissions from UEs, or a Physical Control Format Indicator Channel (PCFICH) for carrying signaling overhead information such as an indication of how many 66.7-µs time segments are being used for control signaling. Other resource elements can then be reserved for non-control signaling. For instance, the remaining resource elements outside of the control region (e.g., outside of the first one, two, or three symbol times) can be reserved to define a Physical Downlink Shared Channel (PDSCH) as a primary channel for carrying data from the base station to UEs on an as-needed basis. There can be some exceptions to this arrangement, as certain control signals, such as a reference signal useable by UEs to detect and evaluate coverage, may be occasionally allocated to resource elements outside of a subframe's control region.

Each resource element can represent a number of bits, with the number of bits depending on how the data is modulated. The data could be modulated according to various modulation and coding schemes (MCSs) having various orders of modulation. For instance, with Quadrature Phase Shift Keying (QPSK) modulation, each resource element represents 2 bits; with the higher-order 16 Quadrature Amplitude Modulation (16QAM), each resource element represents 4 bits; and with the even higher-order 64QAM, each resource element represents 6 bits. Other examples of MCSs can be used to modulate the data as well.

OVERVIEW

In a system as described above, it may be useful to increase the capacity of one or more control channels defined by the air interface. Such an arrangement could be useful where the air interface normally reserves relatively few of its resource elements for control signaling. Reserving few resource elements for control signaling could result in a limited control signaling capacity that is inadequate for a base station to serve UEs.

One way to increase the capacity of a control channel is to vary the MCS that is used to modulate control signals transmitted on the channel. In particular, increasing the order of the MCS could increase the amount of data (e.g., number of bits) represented by each resource element of the control channel. For instance, as noted above, with QPSK modulation, each resource element represents 2 bits; and with 16QAM modulation, which is a higher-order MCS than QPSK, each resource element represents 4 bits. By increasing the amount of data represented by each resource element, a base station could reduce the quantity of resource elements needed to transmit control signals, thereby freeing up other control channel resource elements and thus effectively increasing the capacity of the control channel.

However, it might not be feasible for a base station to increase the MCS of a control signal to a higher-order MCS if the UE to which the control signal is destined is experiencing poor radio frequency (RF) conditions. Increasing the order of the MCS could increase the complexity of the modulated control signal, and increasing the complexity of the control signal could increase the likelihood of signal noise or other interference preventing the UE from demodulating the signal. Thus, if the UE is receiving significantly weak signals from the base station (e.g., due to the UE being located far from the base station or due to various other network conditions), then increasing the order of the MCS could increase the likelihood of the UE failing to demodulate the control signal.

If the UE fails to demodulate the control signal, the base station could end up engaging in a number of retransmission attempts of the control signal and/or related data. By way of example, the control signal could be a Downlink Control Information (DCI) message that specifies scheduling information to inform the UE what resource elements on the PDSCH will carry data destined to the UE. If the UE is unable to demodulate the DCI message, then the UE may be unable to identify the specified resource elements for obtaining the data destined to the UE. As a result, the base station may then need to retransmit the DCI message and the corresponding data on the PDSCH until the UE successfully demodulates the DCI message and obtains the corresponding data on the PDSCH. This retransmission process could add significant delay to the transmission of the data, thereby resulting in a poor user experience.

As presently contemplated, a base station could address this problem by taking measures to improve the RF conditions detected by the UE before the base station increases the order of the control signal MCS. In particular, the base station could beamform control signals to the UE by transmitting the control signals over a distinct radiation pattern that is specifically defined for the UE. Transmitting the control signals over such a UE-specific beam could increase the power at which the UE receives the control signals and can thereby help improve the UE's ability to demodulate higher-order MCS control signals.

Thus, in accordance with the disclosure, a base station could be serving a UE without beamforming control signals to the UE, and the base station could use a particular MCS to transmit control signals to the UE on a control channel. While serving the UE, the base station could determine that the UE is experiencing threshold poor RF conditions, for instance by determining that the UE is experiencing threshold weak RF signals from the base station. Responsive to determining that the UE is experiencing threshold poor RF conditions, the base station could then reconfigure itself to beamform control signals to the UE, which could increase the power of control signals received by the UE from the base station and improve the UE's ability to demodulate high-order MCS control signals on the control channel. And once the base station is reconfigured to beamform control signals to the UE, the base station could further increase the order of the MCS that the base station uses to transmit control signals to the UE on the control channel, thereby increasing the amount of data represented by resource elements of the control channel and increasing the capacity of the control channel.

Accordingly, in one respect, disclosed herein is a method of controlling wireless communication over an air interface between a base station and a UE served by the base station, where the base station is configured to transmit downlink control signals over the air interface to the UE without the base station beamforming the downlink control signals to the UE and with the base station modulating the downlink control signals using a first MCS. As disclosed, the method includes the base station determining that the UE is experiencing threshold poor RF conditions on the air interface, and, responsive to the determining that the UE is experiencing threshold poor RF conditions on the air interface, the base station reconfiguring itself to beamform downlink control signals to the UE. The method then includes, based on the base station being reconfigured to beamform downlink control signals to the UE, the base station reconfiguring itself to use a second MCS to modulate downlink control signals destined to the UE, where the second MCS is a higher-order MCS than the first MCS.

In another respect, disclosed is another method of controlling wireless communication over an air interface between a base station and a UE served by the base station. As disclosed, the method includes the base station using a first MCS to serve the UE on a control channel of the air interface without beamforming to the UE, and, while serving the UE, the base station determining that the UE is experiencing threshold poor RF conditions on the air interface. The method further includes, responsive to the determining that the UE is experiencing threshold poor RF conditions on the air interface, the base station starting to apply beamforming to the UE. The method then includes, responsive to the base station starting to apply beamforming to the UE, the base station using a second MCS to transmit a control signal to the UE on the control channel of the air interface, where the second MCS is a higher-order MCS than the first MCS.

Still further, disclosed is a base station for controlling wireless communication over an air interface between the base station and a UE served by the base station, where the base station is configured to transmit downlink control signals over the air interface to the UE without the base station beamforming the downlink control signals to the UE and with the base station modulating the downlink control signals using a first MCS. As disclosed, the base station includes an antenna structure for communicating with the UE over the air interface and a controller configured to carry out various base station operations as described herein. By way of example, the base station operations could include determining that the UE is experiencing threshold poor RF conditions on the air interface and, responsive to making such a determination, reconfiguring the base station to beamform downlink control signals to the UE. Additionally, the base station operations could include, based on the base station being reconfigured to beamform downlink control signals to the UE, reconfiguring the base station to use a second MCS to modulate downlink control signals destined to the UE, where the second MCS is a higher-order MCS than the first MCS.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

This description will discuss implementation by way of example in the context of an LTE network. It will be understood, however, that principles of the disclosure can extend to apply in other scenarios as well, such as with respect to other radio access protocols. Further, even within the context of LTE, variations from the details disclosed may be possible. For instance, elements, arrangements, and operations may be added, removed, combined, distributed, or otherwise modified. In addition, it will be understood that operations described as being performed by one or more entities may be implemented in various ways, such as by one or more processing units executing program instructions for instance.

Figure 1:
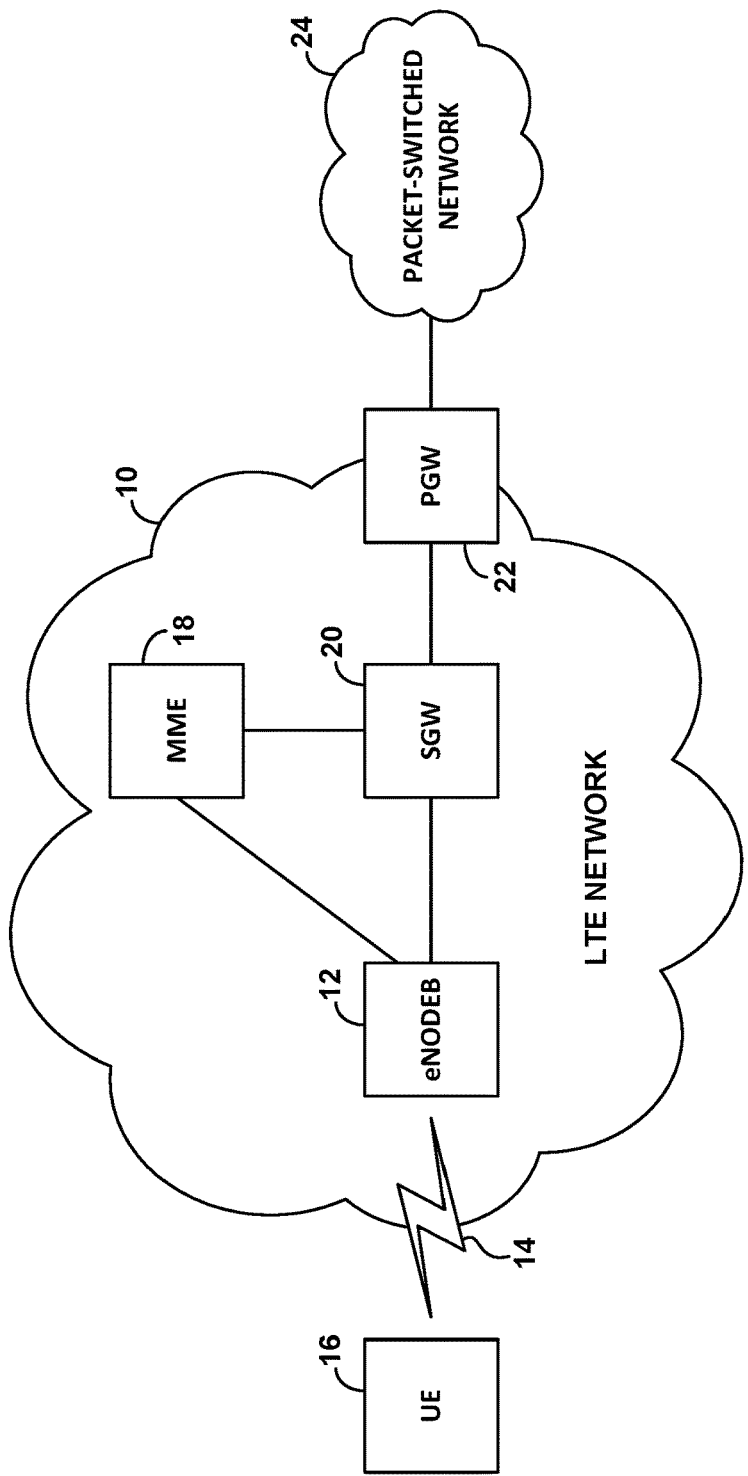
FIG. 1 is a simplified block diagram of a wireless communication system in which the present method and system can be implemented.

Referring to the drawings, as noted above, FIG. 1 is a simplified block diagram of a wireless communication system in which the present method and system can be implemented. In particular, FIG. 1 depicts a representative LTE network 10, which functions primarily to serve UEs with wireless packet data communication service, including possibly voice-over-packet service, but could also provide other functions. As shown, the LTE network includes an eNodeB 12, which has an antenna structure and associated equipment for providing an LTE coverage area (air interface) 14 in which to serve UEs such as an example UE 16 as shown. The eNodeB 12 then has a communication interface with a mobility management entity (MME) 18 that functions as a signaling controller for the LTE network. Further, the eNodeB 12 has a communication interface with a serving gateway (SGW) 20, which in turn has a communication interface with a packet-data network gateway (PGW) 22 that provides connectivity with a packet-switched network 24, and the MME has a communication interface with the SGW 20. In practice, the illustrated components of the LTE network could sit as nodes on a private packet-switched network owned by an operator of the LTE network, and thus the various communication interfaces could be logical interfaces through that network.

With this arrangement as shown, UE 16 could be attached (i.e., registered) with eNodeB 12 on a particular carrier, such as a particular carrier having a defined frequency bandwidth and structure as described above, and the UE could have one or more established bearers for carrying bearer data between the UE and packet-switched network 24. In such an arrangement, the eNodeB could at times receive, from SGW 20 or another source, packet-data that is destined to the UE, and the eNodeB could then schedule and provide downlink transmission of the data over the air to the UE. And when the UE has data to transmit on the packet-switched network, the UE could transmit a scheduling request over the air to the eNodeB, the eNodeB could schedule uplink transmission of the data, the UE could transmit the data accordingly to the eNodeB, and the data could pass to the SGW and to the PGW, for transmission on the packet-switched network.

When transmitting signals to UE 16, eNodeB 12 could use various antenna radiation patterns. For instance, the eNodeB could beamform signals along a direct antenna path specifically focused to the UE, or, instead of beamforming, the eNodeB could transmit signals using a general radiation pattern that is not focused to the UE. To controllably produce a particular antenna radiation pattern, the eNodeB could utilize one or more radiation pattern parameters, which specify how the eNodeB may control such aspects of the antenna structure. For example, the one or more radiation pattern parameters could specify a relative phase, amplitude, tilt, and/or azimuth of each antenna of the antenna structure for a given antenna radiation pattern. As another example, some antenna radiation patterns could be specified by a set of beamforming coefficients in which each coefficient is a complex constant representing a relative amplitude and phase shift for a respective one of the antennas in a phased array of antennas. Other example parameters may also be possible.

In an example implementation, eNodeB 12 could include or have access to a table that maps various antenna radiation patterns to corresponding radiation pattern parameters, and the eNodeB could be programmed to refer to that table to determine the radiation parameter(s) corresponding to a desired antenna radiation pattern. The eNodeB could then impose the determined parameter(s) to transmit and/or receive signals on the antennas of the antenna structure according to the desired antenna radiation pattern.

With this arrangement, eNodeB 12 could be configured by default to transmit downlink control signals to UE 16 without beamforming to the UE, thus using a radiation pattern that is not focused to the UE. For instance, when scheduling downlink or uplink transmission of data to or from UE 16, eNodeB 12 could transmit a DCI message to UE 16 using a radiation pattern that somewhat evenly covers an area radially extending from eNodeB 12. Other examples of non-beamforming radiation patterns can be used as well. Thus, eNodeB 12 could transmit the DCI message to UE 16 using the eNodeB's general downlink radiation pattern rather than focusing the transmission specifically in the direction of the UE.

In practice, eNodeB 12 could transmit the DCI message in the PDCCH (or control region) of a particular subframe. The DCI message could indicate how UE 16 should receive data in the PDSCH of the current subframe, or how the UE should transmit data on the PUSCH in an upcoming subframe. For instance, a DCI message in a particular subframe generally schedules downlink communication of bearer data to a particular UE (i.e., a UE-specific data transmission), by specifying what PDSCH resource elements in the particular subframe carry the bearer data, what MCS is used for bearer data in the specified resource elements, and so forth.

Each DCI message could span a particular set of resource elements on the PDCCH (e.g., one, two, four, or eight control channel elements (CCEs), each including 36 resource elements) and could include a cyclic redundancy check (CRC) that is masked (scrambled) with an identifier (e.g., cell radio network temporary identifier (C-RNTI)) assigned to the UE, so that the UE can identify and read the DCI message. In practice, a UE could monitor the PDCCH in each subframe in search of a DCI message destined to the UE. In particular, the UE could engage in a "blind decoding" process in which the UE reads various candidate groups of resource elements on the PDCCH in search of a DCI message masked with the UE's identifier. If the UE finds such a DCI message, the UE could then read that DCI message and proceed as indicated. For instance, if the DCI message schedules downlink communication of bearer data to the UE in particular resource elements of the current subframe, the UE could then read the data carried by the indicated PDSCH resource elements, to receive that bearer data.

Further, eNodeB 12 could modulate the DCI message using a particular MCS. As discussed above, using a lower-order MCS generally provides more reliable transmissions when the UE is experiencing relatively weak RF conditions, but the transmissions could be less efficient as the DCI message could be allocated among a significant quantity of resource elements. On the other hand, using a higher-order MCS generally provides more efficient transmissions by reducing the quantity of resource elements needed to transmit the DCI message, but could also result in potentially less reliable transmissions. Thus, in order to reduce the likelihood of its served UEs failing to demodulate control messages from the eNodeB, the eNodeB could be configured by default to modulate DCI messages using a lower-order MCS, such as using BPSK or QPSK modulation.

However, as further noted above, the limited capacity of control channels defined by the air interface (e.g., the PDCCH) could be inadequate for an eNodeB that modulates DCI messages using a lower-order, less efficient MCS, such that it could be advantageous for the eNodeB to modulate DCI messages using a higher-order, more efficient MCS. But using a higher-order MCS to modulate DCI messages destined to a UE experiencing poor RF conditions could increase the likelihood of the UE failing to demodulate the DCI message. Thus, before transmitting a high-order MCS DCI message to the UE, the eNodeB could be configured to determine whether a particular UE is experiencing poor RF conditions and responsively take measures to improve the RF conditions detected by the UE. In particular, the eNodeB could improve the UE's RF conditions by beamforming signals to the UE.

In practice, eNodeB 12 could determine that UE 16 is experiencing poor RF conditions in a variety of ways. In some examples, the eNodeB could make such a determination based on a reporting message from the UE. For instance, the UE could, from time to time, determine its channel quality based at least on downlink air interface quality (e.g., downlink reference signal strength) and could transmit to the eNodeB a channel quality indicator (CQI) indicating the UE's determined channel quality. If the reported CQI is below a threshold value, then the eNodeB could determine that the UE is experiencing poor RF conditions.

Alternatively or additionally, eNodeB 12 could determine that UE 16 is experiencing poor RF conditions responsive to determining that the UE is located near an edge of the eNodeB's coverage area, as a UE located far from the eNodeB is more likely to receive weak RF signals from the eNodeB. The eNodeB could determine that the UE is located near an edge of the eNodeB's coverage area by, for instance, determining that the UE was recently handed over from being served by a neighboring eNodeB to being served by eNodeB 12. Handover of a UE typically occurs as the UE moves between coverage areas of neighboring eNodeBs. As such, a UE being recently handed over to an eNodeB could indicate that the UE recently entered the eNodeB's coverage area and is therefore located near an outer edge of the coverage area. Thus, eNodeB 12 could determine that UE 16 is experiencing poor RF conditions responsive to determining that the UE was handed over to the eNodeB within a recent, predetermined time period. Other examples are possible as well.

In any case, once eNodeB 12 has determined that UE 16 is experiencing poor RF conditions, the eNodeB could responsively engage in beamforming to the UE in order to improve the UE's RF conditions. In particular, the eNodeB could start to beamform downlink control signals, such as DCI messages, to the UE. In order to begin beamforming to the UE, the eNodeB could evaluate signaling from the UE as a basis to direct transmission to the UE. By way of example, the eNodeB could receive a reference signal from the UE, and the eNodeB could use amplitude and/or phase information or the like from that signal as a basis to set amplitudes, phases, and/or other attributes of downlink transmission to the UE so as to focus an antenna path in the direction of the UE. The eNodeB could then transmit control signals to the UE along the focused antenna path. Alternatively, the UE could transmit precoding matrix information or the like in a control signal, which the eNodeB could use as a basis to beamform to the UE. Still alternatively, the eNodeB might be able to use geo-location of the UE as a basis to direct transmission to the UE. Advantageously, beamforming may thus improve downlink service to the UE.

With improved downlink service to the UE, the UE could more feasibly demodulate signals that have been modulated using a high-order MCS. Thus, eNodeB 12 could be configured such that, sometime after eNodeB 12 starts to beamform downlink control signals to UE 16, eNodeB 12 increases the order of the MCS used to modulate the downlink control signals. In some examples, eNodeB 12 could increase the order of the MCS for downlink control signals responsive to starting to beamform downlink control signals to UE 16. For instance, if, before beamforming to UE 16, eNodeB 12 is configured to transmit control signals to UE 16 using BPSK or QPSK modulation, then, responsive to starting to beamform downlink control signals to UE 16, eNodeB 12 could reconfigure itself to transmit control signals to UE 16 using QAM modulation (e.g., 16QAM or 64QAM). Similarly, if, before beamforming to UE 16, eNodeB 12 is configured to transmit control signals to UE 16 using 16QAM modulation, then, responsive to starting to beamform downlink control signals to UE 16, eNodeB 12 could reconfigure itself to transmit control signals to UE 16 using 64QAM modulation. Other examples are possible as well.

In practice, before using the higher-order MCS to transmit a control signal to UE 16, eNodeB 12 could transmit a control message to UE 16 specifying the higher-order MCS that eNodeB 12 has been reconfigured to use. As such, UE 16 could further reconfigure itself to apply the appropriate demodulation scheme when demodulating subsequent control signals from eNodeB 12. For instance, when UE 16 engages in subsequent blind decoding of resource elements on the PDCCH channel in search of a DCI message masked with the UE's identifier, the UE could demodulate the resource elements according to the specified higher-order MCS. Other examples are possible as well.

Additionally, while the above examples contemplate the eNodeB increasing the modulation order of DCI messages given that the eNodeB is configured to beamform DCI messages to the UE, the above examples could also apply to the downlink transmission of various other types of control signals and are not limited to the downlink transmission of DCI messages. For instance, the methods and systems disclosed herein could additionally or alternatively be applied to the downlink transmission of Hybrid Automatic Repeat Request (HARQ) messages on the Physical Hybrid ARQ Indicator Channel (PHICH). Other examples are possible as well.

Figure 2:
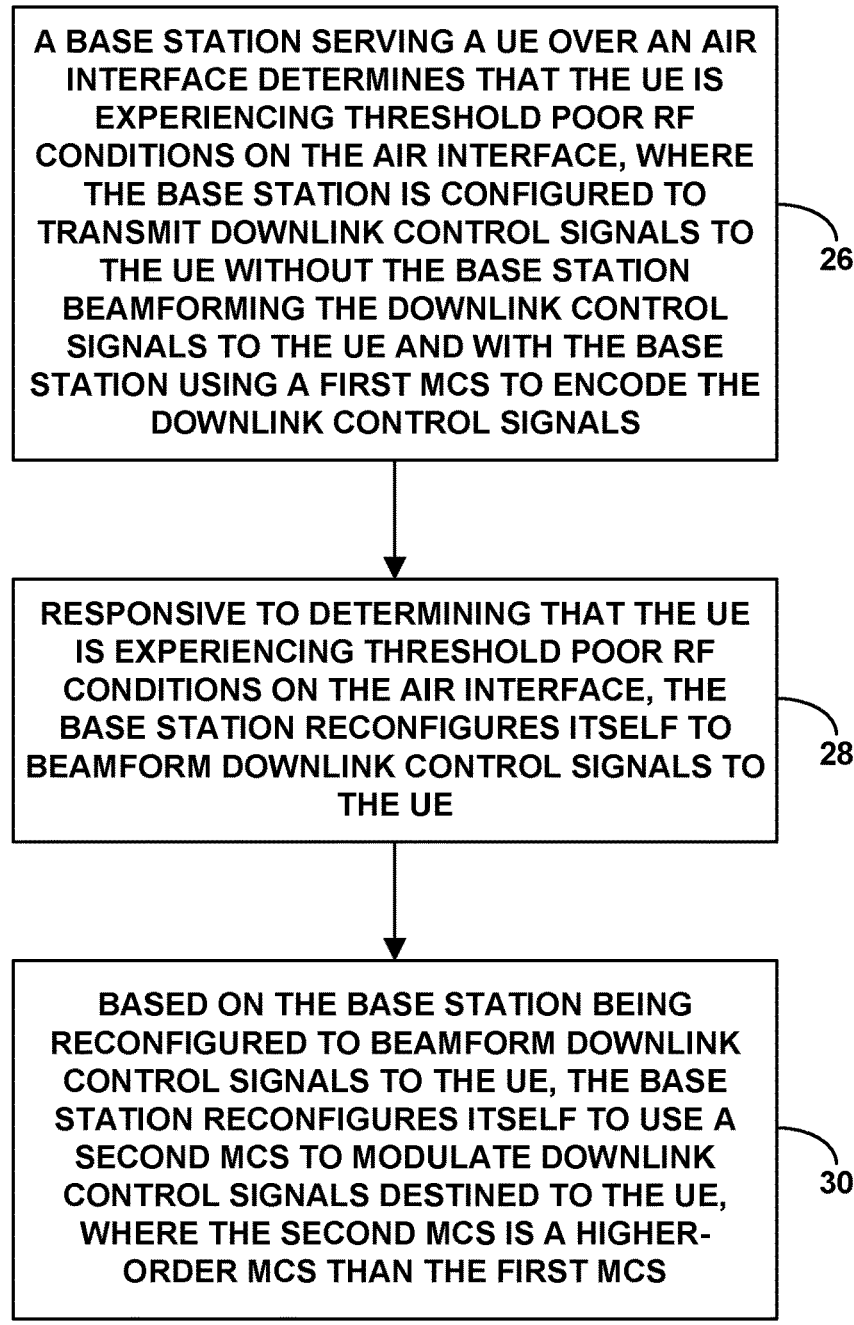
FIG. 2 is a flow chart depicting example operations in accordance with the disclosure.

FIG. 2 is next a flow chart depicting a method that could be carried out by a representative base station to control wireless communication over an air interface between the base station and a UE. In accordance with the method, the base station could be configured to transmit downlink control signals over the air interface to the UE without the base station beamforming the downlink control signals to the UE and with the base station using a first MCS to modulate the downlink control signals. As shown in FIG. 2, at block 26, the method involves the base station determining that the UE is experiencing threshold poor RF conditions on the air interface. At block 28, the method then involves the base station reconfiguring itself to beamform downlink control signals to the UE, responsive to the base station determining that the UE is experiencing threshold poor RF conditions on the air interface. And at block 30, the method involves, based on the base station being reconfigured to beamform downlink control signals to the UE, the base station reconfiguring itself to use a second MCS to modulate downlink control signals destined to the UE, where the second MCS is a higher-order MCS than the first MCS.

In line with the discussion above, the base station could determine that the UE is experiencing threshold poor RF conditions on the air interface based on a CQI from the UE or by determining that the UE is located near an edge of a coverage area of the base station.

Further in line with the discussion above, the first MCS could be a BPSK or QPSK MCS, and the second MCS could be a higher-order QAM MCS. Alternatively, the first MCS could be a first QAM MCS (e.g., 16QAM), and the second MCS could be a second QAM MCS (e.g., 64QAM) that is a higher-order MCS than the first QAM MCS.

Figure 3:
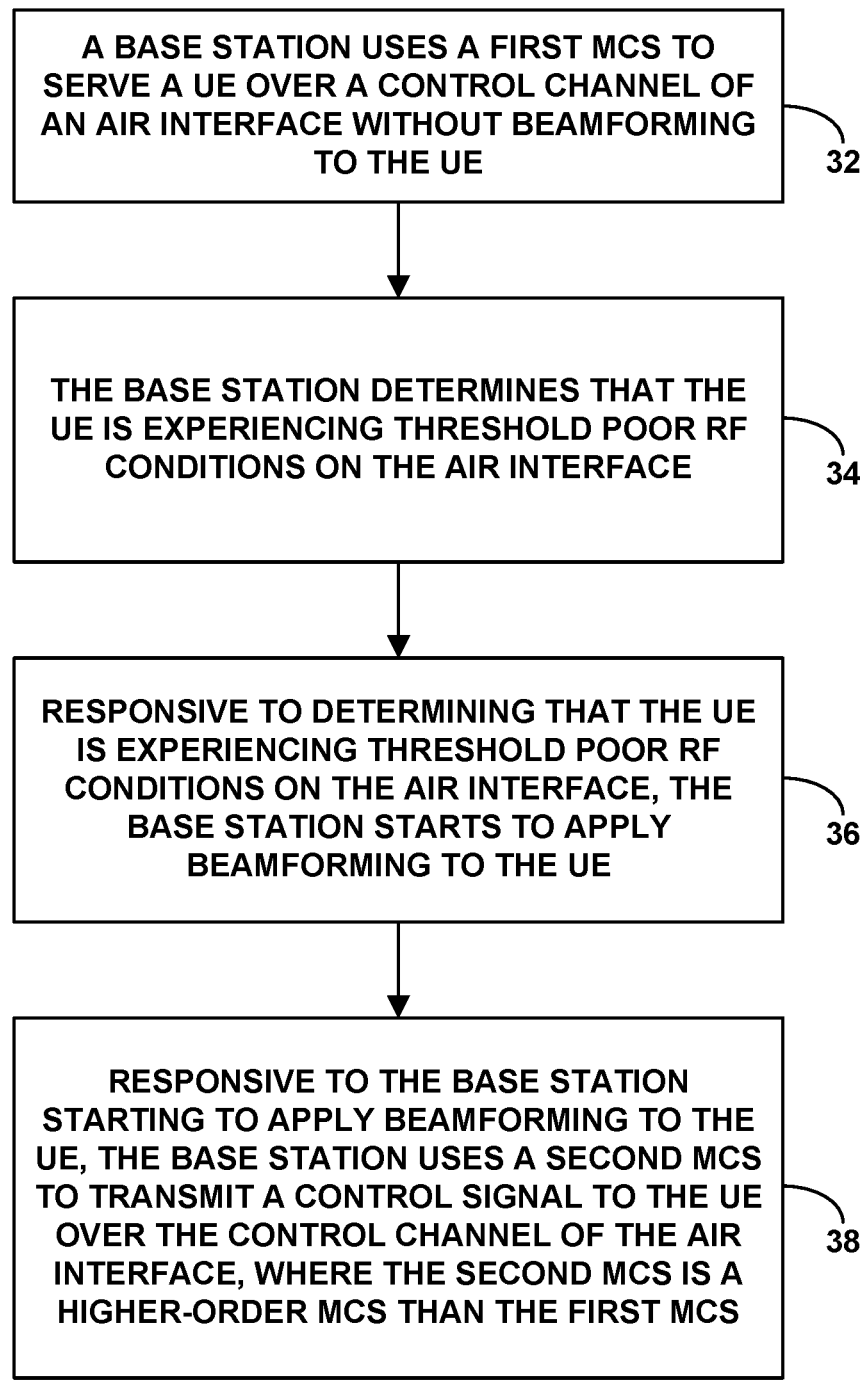
FIG. 3 is another flow chart depicting example operations in accordance with the disclosure.

FIG. 3 is next another flow chart depicting an alternative embodiment of the method, again that could be carried out by a representative base station to control wireless communication over an air interface between the base station and a UE. As shown in FIG. 3, at block 32, the method involves the base station using a first MCS to serve a UE over a control channel of an air interface without the base station beamforming to the UE. And at block 34, the method involves the base station determining that the UE is experiencing threshold poor RF conditions on the air interface. At block 36, the method then involves, responsive to the base station determining that the UE is experiencing threshold poor RF conditions on the air interface, the base station starting to apply beamforming to the UE. And at block 38, the method involves, responsive to the base station starting to apply beamforming to the UE, the base station using a second MCS to transmit a control signal to the UE over the control channel of the air interface, where the second MCS is a higher-order MCS than the first MCS.

Again, in line with the discussion above, the base station could determine that the UE is experiencing threshold poor RF conditions on the air interface based on a CQI from the UE or by determining that the UE is located near an edge of a coverage area of the base station.

Likewise, the first MCS could be a BPSK or QPSK MCS, and the second MCS could be a higher-order QAM MCS. Alternatively, the first MCS could be a first QAM MCS (e.g., 16QAM), and the second MCS could be a second QAM MCS (e.g., 64QAM) that is a higher-order MCS than the first QAM MCS.

Further, the act of the base station using the second MCS to transmit the control signal to the UE over the control channel of the air interface could involve the base station using the second MCS to transmit a DCI message to the UE on the PDCCH, where the DCI message includes a CRC masked with an identifier of the UE.

Figure 4:
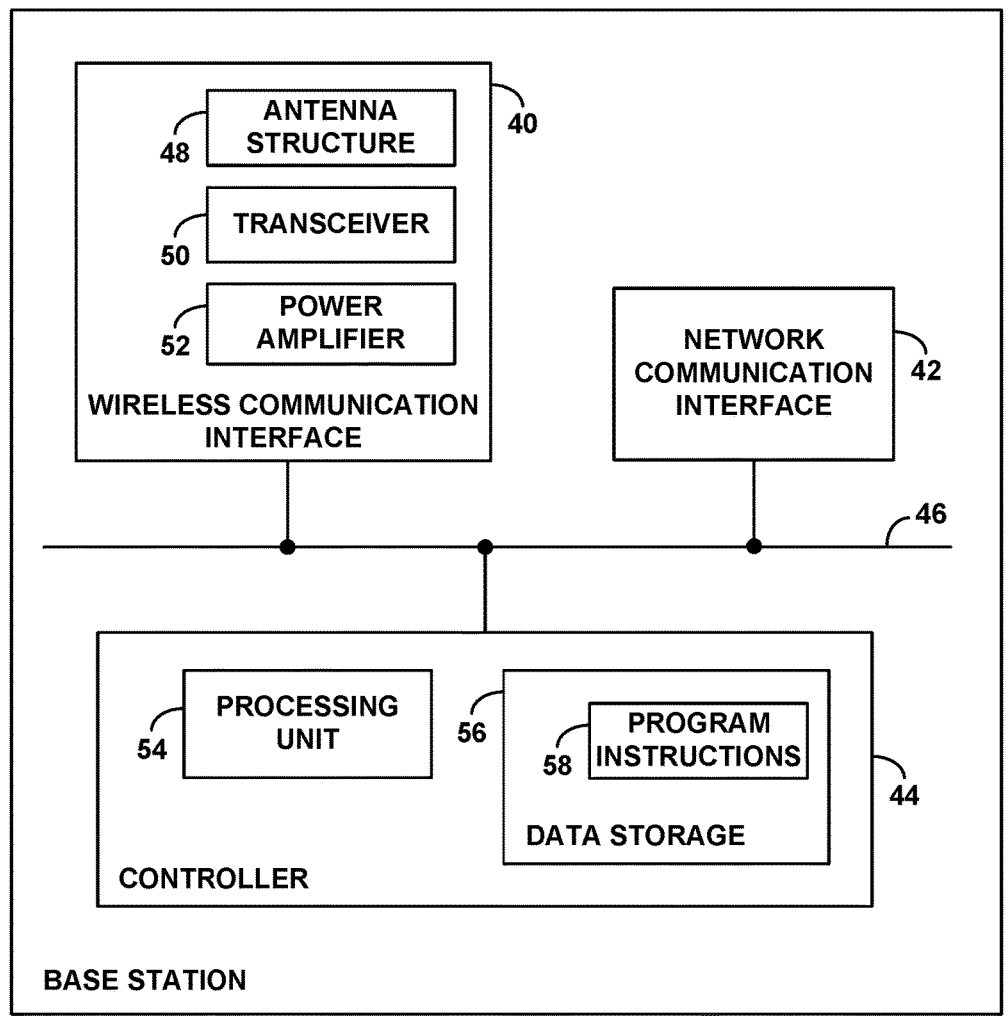
FIG. 4 is a simplified block diagram of an example base station operable in accordance with the disclosure.

Finally, FIG. 4 is a simplified block diagram of a base station (e.g., macro eNodeB, small cell, or other type of base station), showing some of the components that such an entity may include in order to carry out these and other operations. As shown, the example base station includes a wireless communication interface 40, a network communication interface 42, and a controller 44, all of which could be integrated together in various ways or, as shown, interconnected with each other through a system bus, network, or other connection mechanism 46.

The wireless communication interface 40 includes an antenna structure (e.g., one or more antennas or antenna elements) 48, which could be tower mounted or provided in some other manner, configured to transmit and receive over the air interface and thereby facilitate communication with served UEs. Further, the wireless communication interface includes a transceiver 50 and power amplifier 52 supporting air interface communication according to the LTE protocol. In practice, the wireless communication interface 40 could emit RF radiation to define a coverage area, and the emitted RF radiation could be adaptively formed into UE-specific beams. To facilitate this, the antenna structure 48 could include at least one directional (or sectored) array of antenna elements that are capable of adaptive beamforming. Such an antenna structure could be an active antenna array, in which case each of the array's antenna elements could be integrated with respective RF components (e.g., a respective power amplifier and transceiver) that control the antenna element individually. Other arrangements are also possible.

The network communication interface 42 generally serves to connect the base station to a wireless carrier network (e.g., via a controller and/or some other entity). The network communication interface 42 could thus take any suitable form to serve this purpose, examples of which include an Ethernet interface, a serial bus interface (e.g., Firewire, USB 2.0, etc.), a chipset and antenna adapted to facilitate wireless communication, and/or any other interface that provides for wired and/or wireless communication. Further, the network communication interface 42 could also include multiple interfaces. Other configurations are possible as well.

The controller 44 may generally function to control the base station's air-interface communication with UEs, and may be configured to carry out various base station functions described herein. For instance, in a situation where the base station is configured to transmit downlink control signals to a UE over a downlink control channel of an air interface without the base station beamforming to the UE, the controller 44 could determine that the UE is experiencing threshold poor RF conditions on the air interface and, responsive to making such a determination, the controller 44 could reconfigure the base station to beamform downlink control signals to the UE. Then, based on the base station being reconfigured to beamform downlink control signals to the UE, the controller 44 could reconfigure the base station to increase the order of the MCS used for transmitting downlink control signals to the UE on the control channel of the air interface.

The controller 44 could be implemented using hardware, software, and/or firmware. For example, the controller 44 could include one or more processors and a non-transitory computer readable medium (e.g., volatile and/or non-volatile memory) that stores executable instructions. The executable instructions, when executed by the one or more processors, could cause the controller 44 (and thus the base station) to perform any of the base station functions described herein.

Exemplary embodiments have been described above. Those skilled in the art will understand, however, that changes and modifications may be made to these embodiments without departing from the true scope and spirit of the invention.

We claim:

1. A method of controlling wireless communication over an air interface between a base station and a user equipment device (UE) served by the base station, wherein the base station is configured to transmit downlink control signals over a Physical Downlink Control Channel (PDCCH) defined by the air interface to the UE without the base station beamforming the PDCCH control signals to the UE and with the base station modulating the PDCCH control signals using a first modulation and coding scheme (MCS), the method comprising:

the base station determining that the UE is experiencing threshold poor radio frequency (RF) conditions on the air interface, wherein the base station determining that the UE is experiencing threshold poor RF conditions on the air interface comprises: (i) the base station receiving a channel quality indicator (CQI) from the UE and (ii) the base station determining that the UE is experiencing threshold poor RF conditions on the air interface based on the received CQI;

responsive to the determining that the UE is experiencing threshold poor RF conditions on the air interface, the base station reconfiguring itself to beamform PDCCH control signals to the UE; and based on the base station being reconfigured to beamform PDCCH control signals to the UE, the base station reconfiguring itself to use a second MCS to modulate PDCCH control signals destined to the UE, wherein the second MCS is a higher-order MCS than the first MCS.

2. The method of claim 1, further comprising:

responsive to the base station (i) reconfiguring itself to beamform PDCCH control signals to the UE and (ii) reconfiguring itself to use the second MCS to modulate PDCCH control signals destined to the UE, the base station using beamforming and the second MCS to transmit a PDCCH control signal over the air interface to the UE.

3. The method of claim 2, wherein the transmitted PDCCH control signal is a downlink control information (DCI) message, and wherein the DCI message includes a cyclic redundancy check (CRC) masked with an identifier of the UE.

4. The method of claim 1, wherein the basestation determining that the UE is experiencing threshold poor RF conditions on the air interface further comprises:

the base station determining that the UE is located near an edge of a cell of the base station; and the base station determining that the UE is experiencing threshold poor RF conditions on the air interface based on the determining that the UE is located near the edge of the cell.

5. The method of claim 4, wherein the base station determining that the UE is located near the edge of the cell comprises:

the base station determining that a handover of the UE to the base station was performed during a recent time period; and responsive to the determining that the handover of the UE to the base station was performed during the recent time period, determining that the UE is located near the edge of the cell.

6. The method of claim 1, wherein the first MCS is a binary phase-shift keying (BPSK) MCS or a quadrature phase-shift keying (QPSK) MCS, and wherein the second MCS is a quadrature amplitude modulation (QAM) MCS.

7. The method of claim 1, wherein the first MCS is a first quadrature amplitude modulation (QAM) MCS, and wherein the second MCS is a higher-order QAM MCS than the first QAM MCS.

8. The method of claim 1, wherein the base station is an evolved Node B (eNodeB) of a Long Term Evolution (LTE) network.

9. A method of controlling wireless communication over an air interface between a base station and a user equipment device (UE), the method comprising:

the base station using a first modulation and coding scheme (MCS) to serve the UE on a Physical Downlink Control Channel (PDCCH) of the air interface without beamforming to the UE;

the base station determining that the UE is experiencing threshold poor radio frequency (RF) conditions on the air interface, wherein the base station determining that the UE is experiencing threshold poor RF conditions on the air interface comprises: (i) the base station receiving a channel quality indicator (CQI) from the UE and (ii) the base station determining that the UE is experiencing threshold poor RF conditions on the air interface based on the received CQI;

responsive to the base station determining that the UE is experiencing threshold poor RF conditions on the air interface, the base station starting to apply beamforming to the UE on the PDCCH; and responsive to the base station starting to apply beamforming to the UE on the PDCCH, the base station using a second MCS to transmit a control signal to the UE on the PDCCH of the air interface, wherein the second MCS is a higher-order MCS than the first MCS.

10. The method of claim 9, wherein the base station determining that the UE is experiencing threshold poor RF conditions on the air interface further comprises:

the base station determining that the UE is located near an edge of a cell of the base station; and the base station determining that the UE is experiencing threshold poor RF conditions on the air interface based on the determining that the UE is located near the edge of the cell.

11. The method of claim 9, wherein the base station determining that the UE is located near the edge of the cell further comprises:

the base station determining that a handover of the UE to the base station was performed during a recent time period; and responsive to the determining that the handover of the UE to the base station was performed during the recent time period, determining that the UE is located near the edge of the cell.

12. The method of claim 9, wherein the transmitted PDCCH control signal is a downlink control information (DCI) message, and wherein the DCI message includes a cyclic redundancy check (CRC) masked with an identifier of the UE.

13. The method of claim 9, wherein the first MCS is a binary phase-shift keying (BPSK) MCS or a quadrature phase-shift keying (QPSK) MCS, and wherein the second MCS is a quadrature amplitude modulation (QAM) MCS.

14. A base station configured to control wireless communication over an air interface between the base station and a user equipment device (UE) served by the base station, wherein the base station is configured to transmit downlink control signals over a Physical Downlink Control Channel (PDCCH) defined by the air interface to the UE without the base station beamforming the PDCCH control signals to the UE and with the base station modulating the PDCCH control signals using a first modulation and coding scheme (MCS), the base station comprising:

an antenna structure for communicating with the UE over the air interface; and a controller configured to carry out operations comprising (i) determining that the UE is experiencing threshold poor radio frequency (RF) conditions on the air interface, wherein determining that the UE is experiencing threshold poor RF conditions on the air interface comprises: (a) receiving a channel quality indicator (CQI) from the UE and (b) determining that the UE is experiencing threshold poor RF conditions on the air interface based on the received CQI, (ii) responsive to the determining that the UE is experiencing threshold poor RF conditions on the air interface, reconfiguring the base station to beamform PDCCH control signals to the UE, and (iii) based on the base station being reconfigured to beamform PDCCH control signals to the UE, reconfiguring the base station to use a second MCS to modulate PDCCH control signals destined to the UE, wherein the second MCS is a higher-order MCS than the first MCS.

15. The base station of claim 14, the operations further comprising:
responsive to (i) reconfiguring the base station to beamform PDCCH control signals to the UE and (ii) reconfiguring the base station to use the second MCS to modulate PDCCH control signals destined to the UE, causing the base station to use beamforming and the second MCS to transmit a PDCCH control signal over the air interface to the UE.

16. The base station of claim 15, wherein the transmitted PDCCH control signal is a downlink control information (DCI) message, and wherein the DCI message includes a cyclic redundancy check (CRC) masked with an identifier of the UE.

17. The base station of claim 14, wherein determining that the UE is experiencing threshold poor RF conditions on the air interface further comprises:
determining that the UE is located near an edge of a cell of the base station; and determining that the UE is experiencing threshold poor RF conditions on the air interface based on the determining that the UE is located near the edge of the cell.

18. The base station of claim 17, wherein determining that the UE is located near the edge of the cell comprises:
determining that a handover of the UE to the base station was performed during a recent time period; and
responsive to the determining that the handover of the UE to the base station was performed during the recent time period, determining that the UE is located near the edge of the cell.

19. The base station of claim 14, wherein the first MCS is a binary phase-shift keying (BPSK) MCS or a quadrature phase-shift keying (QPSK) MCS, and wherein the second MCS is a quadrature amplitude modulation (QAM) MCS.

20. The base station of claim 14, wherein the first MCS is a first quadrature amplitude modulation (QAM) MCS, and wherein the second MCS is a higher-order QAM MCS than the first QAM MCS.

* * * * *